Nov. 7, 1967  E. CONRAD  3,351,876

ELECTRICAL TRANSMISSION SYSTEM

Filed Oct. 26, 1964  3 Sheets-Sheet 1

INVENTOR.
ELTON CONRAD,
BY
Noel B. Hammond
AGENT.

Nov. 7, 1967  E. CONRAD  3,351,876

ELECTRICAL TRANSMISSION SYSTEM

Filed Oct. 26, 1964  3 Sheets-Sheet 2

INVENTOR.
ELTON CONRAD,
BY
Noel B. Hammond
AGENT.

Nov. 7, 1967 — E. CONRAD — 3,351,876
ELECTRICAL TRANSMISSION SYSTEM
Filed Oct. 26, 1964 — 3 Sheets-Sheet 3
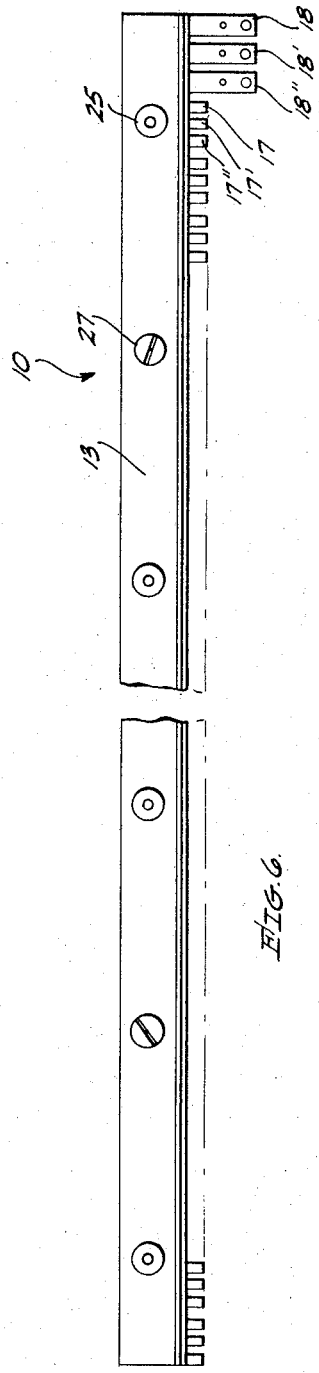
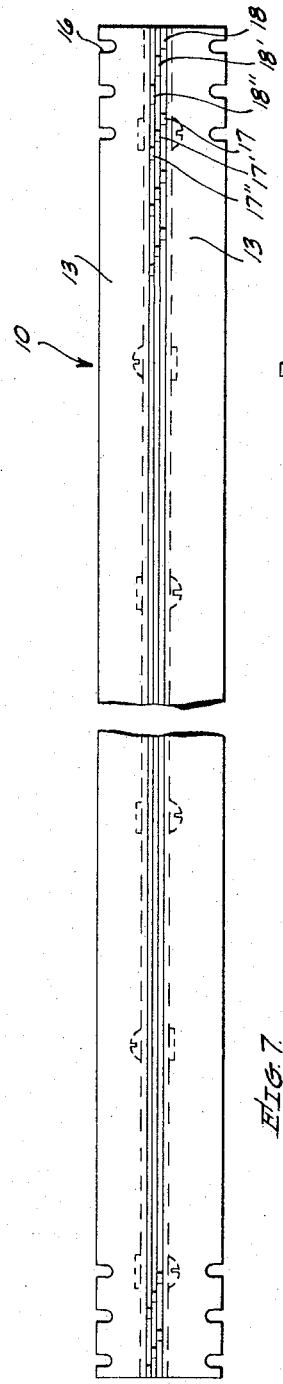
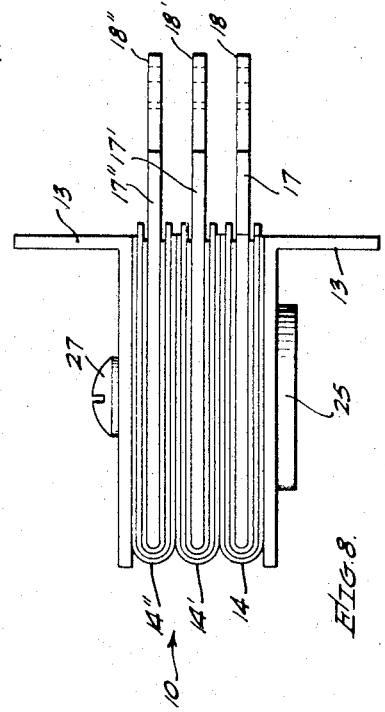
INVENTOR.
ELTON CONRAD,
BY
Noel B. Hammond
AGENT.

United States Patent Office 3,351,876
Patented Nov. 7, 1967

3,351,876
ELECTRICAL TRANSMISSION SYSTEM
Elton Conrad, Anaheim, Calif., assignor to Hughes Aircraft Company, Culver City, Calif., a corporation of Delaware
Filed Oct. 26, 1964, Ser. No. 406,378
4 Claims. (Cl. 333—84)

The present invention relates to electrical transmission lines and, more particularly, to a transmission system having an extremely low characteristic impedance.

In some complex electronic equipment, such as computers for example, there may be many electronic circuits being switched off or on simultaneously, as when the switching is initiated by a clock pulse. Frequently, transient electrical fluctuations caused by the switching are transmitted throughout the system by the distribution lines which supply the direct current operating voltages to the individual circuits. These transient fluctuations may cause faulty operation of the equipment, a decrease of the speed with which it operates or necessitate more precise electrical tolerances on the circuit components. To reduce the effect of such transient fluctuations, it is common practice to use a well-regulated power supply connected to the individual circuits via heavy conductors or bus bars and bypass capacitors connected thereto at a number of points. However, it has been found that these measures are not sufficient to fully eliminate the troublesome effects of transient surges and electrical fluctuations in modern, high-speed, sensitive electronic equipment. Due to the reactance of the transmission lines, they present a sufficiently high characteristic impedance that transient signals of sufficient amplitude to be troublesome are developed in, and transmitted by the transmission lines.

Another area where the need exists for transmission lines having an extremely low characteristic impedance is in low-impedance transducers, such as ferroelectric transducers and in circuits employing cryogenically-cooled electronic components. Cryogenically-cooled circuits, utilizing components such as inductors, resistors, or capacitors cooled to the vicinty of absolute zero temperature, have an extremely low impedance. To obtain efficient power transfer, it is necessary to provide an impedance match between the transmission lines and the cryogenically-cooled circuits. This necessitates the use of transmission lines having an extremely low characteristic impedance of a particular value.

One type of transmission line having an extremely low impedance is a flat, laminated structure having a thin, flat conductive plate forming a center conductor sandwiched between two thin, flat, conductive plates together forming an outer conductor. The plates are placed as close together as possible to reduce the inductance and increase the capacitance to thereby reduce the characteristic impedance to as low a value as possible. Consequently, the insulation which electrically insulates the center conductor from the outer conductors must be as thin as possible. This type of low impedance line has been constructed of anodized aluminum, where the anodized layer serves as the insulation. One disadvantage of this type of aluminum transmission line is that the surface of the aluminum strips must be machined to a smooth, flat finish to ensure that the strips will be in close contact all along their length. Otherwise, high spots will cause varying separation distances between the strips which affects the characteristic impedance of the line. Another disadvantage is that moisture can at times penetrate between the layers and, in conjunction with impurities trapped in the anodized layer, form an electrolyte. Due to the electrical polarization, an electrolytic process begins which destroys the insulating property of the anodized layer, leading to voltage breakdown of the transmission line.

Accordingly, it is an object of the present invention to provide an electrical transmission system which minimizes the effects of transient electrical fluctuations.

Another object of the invention is the provision of an electrical transmission system having an extremely low impedance.

Yet another object of the invention is to provide a laminated type of low impedance transmission structure which does not require the machining of strips to a smooth, flat finish.

A further object of the present invention is the provision of a transmission line which is not subject to electrolytic deterioration under moist and humid conditions.

In accordance with these and other objects of the invention, there is provided a transmission line formed of an elongated, thin, flat laminate folded around an elongated, thin, flat conductive plate. The laminate is made up of two pieces of elongated thin copper sheet or foil separated by a plastic dielectric material such as the oriented transparent film of a polyester condensation product of terephthalic acid and ethylene glycol which is sold under the trade name Mylar. The copper is bonded to the plastic dielectric material, as by means of an adhesive. The edges of the copper sheets are then etched away slightly, as by a process employing photoresist. This prevents the edges of one copper sheet directly overlaying the edges of the other sheet, thereby reducing the possibiilty of voltage breakdown through the plastic dielectric material. The laminate is then folded longitudinally and the plate is inserted in the fold. The laminate enfolding the plate is then clamped between a pair of elongated conductive angle bars, as by means of screws. Connections are made to the transmission line center conductor by means of terminal tabs on the edge of the plate that project above the rest of the structure. Ground connection is made to the outer conductor by bolting the angle bars to the frame of the equipment in which the transmission line is used. The size of the angle bars and the inner plate determine the current-carrying capacity of the line, but the characteristic impedance and voltage breakdown are determined by the laminate. The line has a low inductance and high capacitance due to the close proximity of the two sheets of copper foil, and therefore the line has a very low impedance. Due to the use of copper sheets separated by a plastic dielectric material, moisture will not cause electrolytic deterioration; and machining is not necessary to provide uniform separation between the copper sheets.

The following specification and the accompanying drawings describe and illustrate exemplary embodiments of the present invention. Consideration of the specification and the drawings will provide an understanding of the invention, including the novel features and objects thereof. Like reference characters denote like parts throughout the figures of the drawings.

FIG. 6 is a side view of a multiple transmission line assembly in accordance with the invention;

FIG. 7 is a top view of the multiple transmission line assembly of FIG. 6; and

FIG. 8 is an enlarged end view of the multiple transmission line assembly of FIGS. 6 and 7.

In complex electronic equipment such as high speed electronic computers, for example, there are many individual electronic circuits. These circuits may be mounted on plug-in cards or printed circuit boards, and each of the individual circuits is supplied with direct current (DC) to operate the transistors, vacuum tubes, diodes, or other circuit elements. In the present example, a regulated power supply is connected to a plurality of electronic circuits by a power distribution system in accordance with the invention. The transmission lines have been made as long as 20 inches, although they may be longer or shorter as desired. The transmission lines pass near the terminals of a plurality of circuit boards. Each transmission line supplies on the order of 10 amperes at ten volts in the present example, when all of the circuits are drawing their maximum current. However, the current supplied by the transmission lines varies as the circuits are switched on and off. As the circuits are switched on and off, individually or in unison, transient electrical surges or fluctuations are generated. These switching transients have the nature of high-frequency alternating current (AC) signals, due to their rapid build-up and decay. The AC characteristics of the transmission line are such as to minimize the effects of transient electrical fluctuations, While the DC characteristics are such as to provide optimum transmission of DC.

Figures 1, 4:
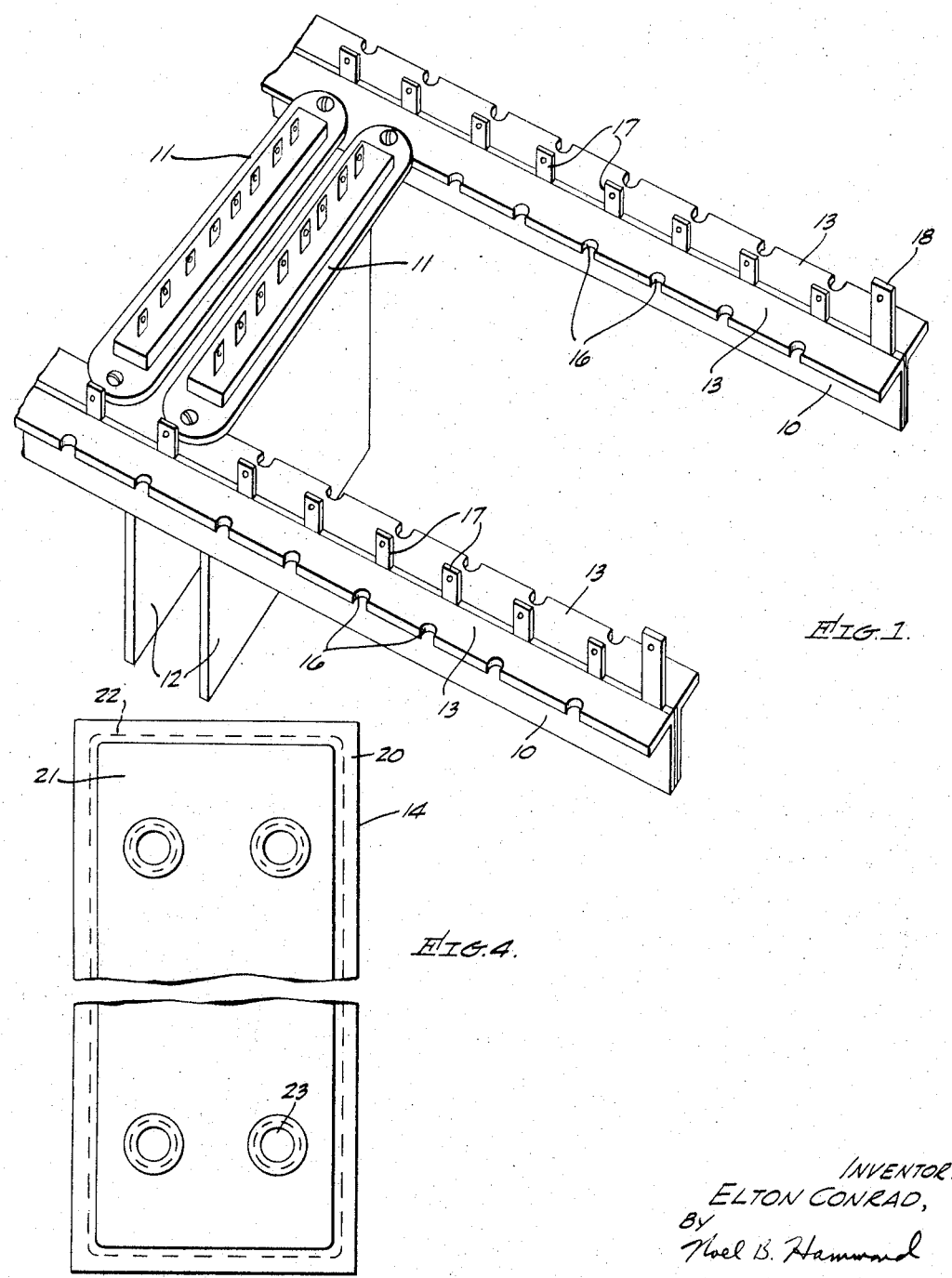
FIG. 1 is a perspective view of a pair of transmission lines in accordance with the present invention, having a pair of circuit card connectors mechanically connected therebetween.
FIG. 4 is a plan view of a laminate etched in a different pattern from that of FIG. 3.

Referring now to FIG. 1 of the drawings, there is illustrated a pair of transmission lines 10 embodying the present invention. The transmission lines 10 extend parallel to each other and form a structural support for connectors 11 which extend therebetween. Circuit cards 12, which are supplied by the transmission lines 10, are plugged into the connectors 11. In this manner, wire connections between the transmission lines 10 and the connectors 11 may be made relatively short. The transmission line 10 is made of a pair of elongated conductive angle bars 13 between which is clamped a laminate 14 (FIG. 2) that is folded around an elongated thin, flat conductive plate 15. The angle bars are provided with a plurality of slots 16 along the edges which serve to fasten the connectors 11 and to fasten the transmission line 10 to a frame. The angle bars 13 may be made of brass or copper and may be in the order of .032 inch thick.

The inner plate 15 is provided with a plurality of terminal tabs 17 spaced at intervals along one edge thereof and extending above the angle bars 13. At one end of the transmission line 10, a somewhat larger terminal tab 18 is located to which a source of DC power may be connected. The inner plate 15 may be made of copper .032 inch thick and may be gold plated to prevent oxidation.

Figure 2:
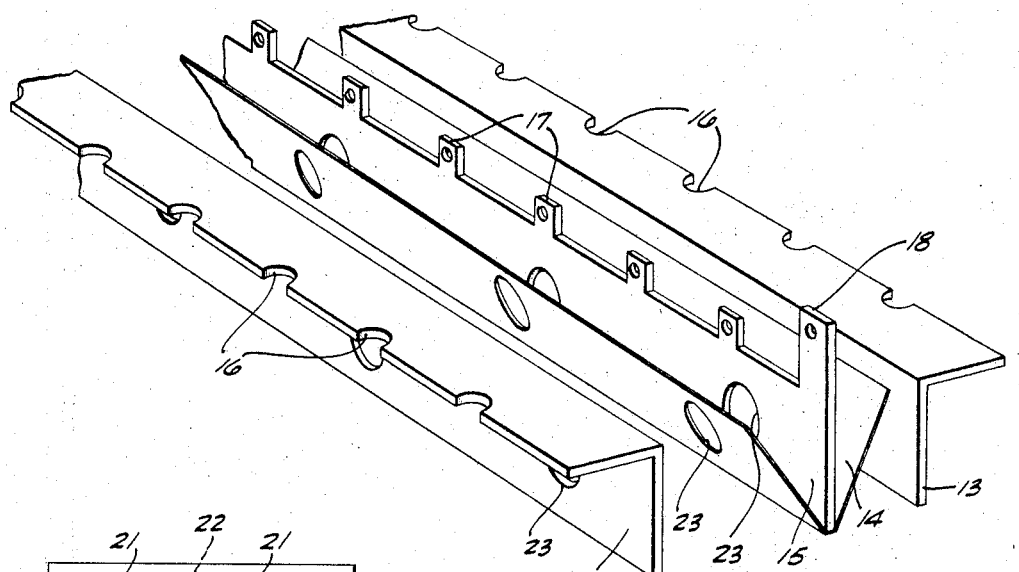
FIG. 2 is an exploded perspective view of a single transmission line constructed in accordance with the invention.
Figure 3:
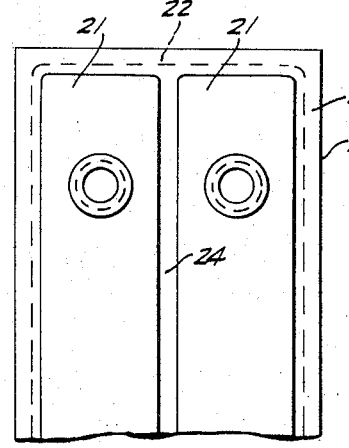
FIG. 3 is a plan view of a laminate employed in the transmission line of FIGS. 1 and 2, shown prior to folding.

The laminate 14, which is shown folded around the inner plate 15 in FIG. 2 is shown unfolded in FIG. 3. It is composed of three layers of thin material: an inner layer of an insulating plastic dielectric 20 between two layers of copper sheet or foil 21, 22. The laminate 14 is paper thin, being on the order of .004 inch thick. The dielectric 20 may be, for example, the oriented transparent film of a polyester condensation product of terephthalic acid and ethylene glycol which is sold under the trade name Mylar. Its thickness may be on the order of .00025 to .0015 inch and it should be as free from pin holes as possible. The dielectric 20 may be formed of a double layer of plastic material, if desired, to further reduce the possibility of electrical breakdown. Two layers of material may be bonded together with an adhesive or by means of heat and pressure. In this manner, any pin holes which may be present are not likely to overlay each other. The dielectric 20 should be of a quality suitable for use as capacitor dielectric and may be purchased from the E. I. du Pont de Nemours Company as Mylar polyester film, type C, capacitor grade.

The outer layers of copper foil 21, 22 are made of one ounce electrolytically deposited copper. The three layers 20, 21, 22 are bonded together in any suitable manner such as, for example, by means of an adhesive. It may be found desirable to first oxidize the surface of the copper foil 21, 22 on the adhesive side to produce a better bond. The bonded laminate may also be purchased ready-made; for example under the trade name "Schjelclad" from the G. T. Schjeldahl Co., Northfield, Minnesota.

As may be seen in FIG. 2 the angle bars 13, laminate 14 and inner plate 15 are provided with holes 23 at the intervals along the length thereof. These holes 23 are for the purpose of clamping the assembly together, as will be explained hereinafter. The copper foil 21, 22 of the laminate 14 is etched to prevent the edges of the copper foil 21, 22 directly overlaying each other. In this manner the possibility of electrical breakdown is further reduced. The layer of copper foil 21 which is adjacent the inner plate 15 when the laminate 14 is folded thereabout, is etched inward from the margin of the other layer of copper foil 22. The outer layer of copper foil 22 is etched away from the margins of the dielectric 20 and away from the holes 23, but not as far as the inner layer of copper foil 21. This is accomplished by conventional printed circuit techniques: by applying a photoresist material to the copper foil 21, 22, exposing it to light in a selected pattern, washing the unexposed resist, etching the copper, and finally removing the remainder of the photoresist.

As shown in FIG. 3, the inner layer of copper foil 21 is etched down the middle, indicated at 24, along a longitudinal line which separates the copper foil 21 into two separate sections. The purpose of etching away the center portion 24 is to insure that the laminate will fold easily about the inner plate 15. However, as indicated in FIG. 4, this is not necessary and if desired, the inner copper foil 21 may be only etched away from the outer margins and away from the margins of the holes 23. After etching, the copper foil 21, 22 may be gold-plated to prevent oxidation of the surface thereof.

Figure 5:
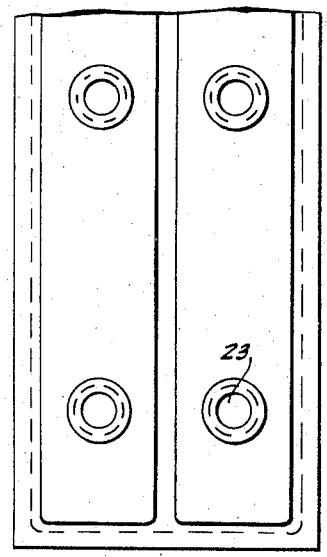
FIG. 5 is an enlarged fragmentary view in cross section of a portion of the transmission line of FIG. 1 illustrating one method of clamping the transmission line assembly together.
Figure 5:
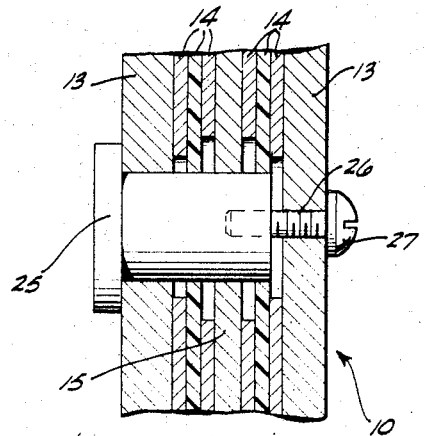

Referring now to FIG. 5, one method of clamping the transmission line 10 together is illustrated. An insulated bushing 25, which may be made of nylon for example, having a flanged end, is inserted through the hole 23 in the first angle bar 13, through the laminate 14 on one side of the inner plate 15, through the laminate 14 on the other side of plate 15, and stops short of the second angle bar 13. A smaller hole 26 is provided at that location for the insertion of a screw 27 which threadably engages the bushing 25 and draws the whole assembly together.

The inner conductor of the transmission line 10 is formed of the inner layer of foil 21 and the inner plate 15. The outer conductor of the transmission line 10 is formed of the outer layer of foil 22 and the angle bars 13. The inner and outer conductors are separated by the plastic dielectric 20. The laminate 14 provides no structural support to the transmission line 10, but does determine the critical electrical characteristics. Due to the high dielectric constant and to the close spacing of the copper foil 21, 22 (determined by the thickness of the dielectric 20), the transmission line 10 has a high capacitance and a low inductance. Therefore, the transmission line 10 has an extremely low characteristic impedance. For example, the inductance of the transmission line 10 may be on the order of .03 nanohenry ($.03 \times 10^{-9}$ henry) per foot, the capacitance may be on the order of 300,000 micro-microfarads per foot, and the characteristic impedance may be on the order of .25 ohm.

By using electrolytically deposited copper foil 21, 22 bonded on either side of the plastic dielectric 20, the critical electrical characteristics of the transmission line 10 do not depend on the surface finish of the angle bars 13 and inner plate 15. Furthermore, a lower impedance is achieved by means of the laminate 14 than can be achieved employing the same materials in another arrangement where the impedance is dependent on the flatness and surface finish of the conductors to make intimate uniform contact with the dielectric material. Another advantage of the laminate 14 employing copper foil 21, 22 bonded to the plastic dielectric 20, is that conditions of high humidity and moisture do not produce electrolytic action that causes deterioration of the transmission line 10.

The angle bars 13 and the inner plate 15 contribute structural rigidity to the transmission line 10 and, in addition, increase the current-carrying capacity. The transmission line 10 has a current-carrying capacity on the order of 10 amperes and may have a D.C. resistance on the order of .003 ohm.

It has been found that in computers using conventional wiring instead of the transmission lines 10 of the present invention, the speed of the gate circuits is in the range of 500–1000 nanoseconds (.5–1 microsecond). When the transmission lines 10 of the present invention are used to distribute power to the circuit boards 12 in the manner indicated in FIG. 1, the gate circuits may be speeded up to operate in times as short as approximately 20 nanoseconds. This improvement, althongh not entirely due to the transmission lines 10, is difficult if not impossible to attain unless the transient surges and fluctuations in the supply voltages are suppressed. The high capacitance of the transmission line 10 bypasses high frequency components. The low characteristic impedance insures that any A.C. components developed across the transmission line 10 are of small amplitude.

Where several different D.C. voltages are to be supplied the transmission line 10 may be made in multiple layers, as shown in FIGS. 6, 7 and 8. Each layer may provide a different voltage. The structure of the transmission line 10 is the same except that additional laminates 14 and inner plates 15 are clamped between the angle bars 13. In the example depicted, three units are in multiple. The terminal tabs 17, 17', 17" and 18, 18', and 18" are staggered or longitudinally displaced to avoid short circuits, as shown in FIGS. 6 and 7. As shown in FIG. 8, three laminates 14, 14', 14" are individually folded around their respective inner plates 15, 15', 15", and the three assemblies are clamped side-by-side between the two angle bars 13 by means of the bushing 25 and screw 27. The intimate contact between the three assemblies provides the ground connection from the angle bars 13 to each of the laminates 14, 14', 14".

When the laminate pattern of FIG. 4 is employed, it may be desirable to fold the laminate 14 in the opposite direction so that the layer of foil 21 which is etched inward from the margin of the other layer of foil 22, is on the outside rather than on the inside next to the inner plate 15. This slightly lengthens the short-circuit path so that the transmission line 10 is less susceptible to voltage breakdown.

For applications employing cryogenic circuitry and/or transducers such as ferroelectric transducers where it is necessary to provide a transmission line which matches a specific low value of characteristic impedance, for example .25 ohm, the impedance of the transmission line 10 may be adjusted to the required value during manufacture by varying the spacing between the copper foil 21, 22 or by varying the dielectric constant of the dielectric 20 or by varying the width of the foil 21, 22, angle bars 13 and inner plate 15, in accordance with conventional transmission line theory.

Thus, there has been described an electrical transmission system which minimizes the effects of transient electrical surges and fluctuations; has an extremely low characteristic impedance; does not require precise machining; and is not subject to electrolytic deterioration.

While several embodiments of the invention have been shown and described, other variations may be made, and it is intended that the foregoing disclosure shall be considered only as illustrative of the principles of the invention and not construed in a limiting sense.

What is claimed is:

1. A transmission line having a low characteristic impedance comprising:
   (a) a sheet of dielectric material having a layer of copper foil on each side thereof, said sheet being folded longitudinally;
   (b) first rigid conductive means having terminals projecting from one edge thereof, said conductive means being inserted into the fold of said sheet in contact with one of said layers of foil with said terminals extending beyond said sheet;
   (c) second rigid conductive means disposed on each side of said sheet in contact with the other of said layers of foil;
   (d) and means for forcing said second means together to clamp said sheet and said first means therebetween.

2. A transmission line having a low characteristic impedance comprising:
   (a) a laminate including a thin, elongated sheet of plastic dielectric material having an elongated layer of copper foil bonded to each side thereof, the edges of one of said layers of foil being laterally displaced from the edges of the other of said layers of foil, said laminate being folded longitudinally;
   (b) an elongated conductive plate having terminals projecting from one edge thereof, said plate being inserted into said folded laminate with said terminals extending beyond said laminate;
   (c) a pair of elongated conductive bars, one of said bars being disposed on each side of said laminate with a flat surface adjacent a surface of said laminate;
   (d) and clamping means for forcing said bars together to clamp said laminate and said plate therebetween.

3. A transmission line having a low characteristic impedance comprising:
   (a) a laminate including a thing, elongated sheet of plastic dielectric material having an elongated layer of copper foil bonded to each side thereof, the edges of one of said layers of foil being laterally displaced from the edges of the other of said layers of foil, one of said layers of foil having a narrow elongated strip removed longitudinally down the middle thereof to divide said layer of foil into two separate sections, said laminate being folded longitudinally with said divided layer of foil inward;
   (b) an elongated conductive plate having terminals projecting from one edge thereof, said plate being inserted into said folded laminate with said terminals extending beyond said laminate;
   (c) a pair of elongated conductive angle bars, one of said angle bars being disposed on each side of said laminate with a flat surface adjacent a surface of said laminate;
   (d) and clamping means for forcing said angle bars together to clamp said laminate and said plate therebetween.

4. A transmission line having a low characteristic impedance comprising:
   (a) a plurality of laminates, each including a thin, elongated sheet of plastic dielectric material having an elongated layer of copper foil bonded to each side thereof, the edges of one of said layers of foil being laterally displaced from the edges of the other of said layers of foil, said laminates each being folded longitudinally, said laminates being arranged side-by-side to form a group of parallel coextensive laminates;
   (b) a plurality of elongated conductive plates each having terminals projecting from one edge thereof, each of said plates being inserted into one of said folded laminates with said terminals extending beyond said laminates;
(c) a pair of elongated conductive angle bars, one of said angle bars being disposed on each side of said group of parallel laminates with a flat surface adjacent a surface of one of said laminates;
(d) and clamping means for forcing said angle bars together to clamp said laminates and said plates therebetween.

References Cited

UNITED STATES PATENTS

| | | | |
|---|---|---|---|
| 3,150,336 | 9/1964 | Gouda | 333—33 |
| 3,189,847 | 6/1965 | Rymazewski | 333—1 |
| 3,218,585 | 11/1965 | May | 333—84 |
| 3,264,403 | 8/1966 | Erdle | 174—72 |

HERMAN KARL SAALBACH, *Primary Examiner.*

C. BARAFF, *Assistant Examiner.*